US012789129B2

(12) United States Patent
Chung

(10) Patent No.: US 12,789,129 B2
(45) Date of Patent: Nov. 10, 2026

(54) AEROSOL CAPTURE DEVICE AND CONTROL METHOD THEREOF

(71) Applicant: ELECTRONICS AND TELECOMMUNICATIONS RESEARCH INSTITUTE, Daejeon (KR)

(72) Inventor: Kwang Hyo Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 409 days.

(21) Appl. No.: 18/507,285

(22) Filed: Nov. 13, 2023

(65) Prior Publication Data

US 2024/0207771 A1 Jun. 27, 2024

(30) Foreign Application Priority Data

Dec. 26, 2022 (KR) ........................ 10-2022-0184630

(51) Int. Cl.
*B01D 53/02* (2006.01)
*B01D 47/02* (2006.01)
(Continued)

(52) U.S. Cl.
CPC .............. *B01D 47/027* (2013.01); *B03C 1/01* (2013.01); *B03C 1/30* (2013.01); *B03C 5/022* (2013.01);
(Continued)

(58) Field of Classification Search
CPC ........... B01D 47/027; B03C 1/01; B03C 1/30; B03C 2201/18; B03C 2201/20;
(Continued)

(56) References Cited

U.S. PATENT DOCUMENTS 5,902,385 A 5/1999 Willeke et al.
6,607,579 B2 * 8/2003 Willey ...................... B03C 3/16
95/71

(Continued)

FOREIGN PATENT DOCUMENTS

KR 10-1754794 B1 7/2017
KR 10-2020-0030314 A 3/2020

(Continued)

OTHER PUBLICATIONS

Christopher F. Fronczek et al., "Biosensors for Monitoring Airborne Pathogens", Journal of Laboratory Automation 2015, vol. 20(4) 390-410.

(Continued)

*Primary Examiner* — Christopher P Jones
(74) *Attorney, Agent, or Firm* — LRK PATENT LAW FIRM

(57) ABSTRACT

An aerosol capture device according to the present invention may include a housing including an air inlet through which air introduced, and an air discharge part through which the introduced air flows and the flowing air is discharged, a capture liquid that is accommodated in the housing and captures an aerosol in the air flowing inside the housing, and a concentration part that is disposed inside the housing, is in contact with the capture liquid, and concentrates the aerosol captured in the capture liquid.

20 Claims, 11 Drawing Sheets

(51) Int. Cl.
*B03C 1/01* (2006.01)
*B03C 1/30* (2006.01)
*B03C 5/02* (2006.01)

(52) U.S. Cl.
CPC ...... *B03C 2201/18* (2013.01); *B03C 2201/20* (2013.01)

(58) Field of Classification Search
CPC .. B03C 3/017; B03C 3/08; B03C 3/16; B03C 3/361; B03C 3/368; B03C 3/47; B03C 5/022
See application file for complete search history.

(56) References Cited

U.S. PATENT DOCUMENTS

| | | | | |
|---|---|---|---|---|
| 7,717,980 | B2 * | 5/2010 | Tepper | B03C 3/16 95/71 |
| 8,356,524 | B2 | 1/2013 | Verdier et al. | |
| 8,524,155 | B1 | 9/2013 | Wick | |
| 9,988,691 | B2 | 6/2018 | Sislian et al. | |
| 10,080,857 | B2 | 9/2018 | Sislian et al. | |
| 10,509,029 | B2 * | 12/2019 | Tamura | G01N 15/1492 |
| 2011/0136691 | A1 | 6/2011 | Kim et al. | |
| 2012/0100546 | A1 * | 4/2012 | Lowery, Jr. | C12Q 1/701 435/6.15 |
| 2012/0174650 | A1 * | 7/2012 | Ariessohn | B03C 3/41 73/23.2 |
| 2013/0122485 | A1 | 5/2013 | Hong | |
| 2013/0192462 | A1 | 8/2013 | Pant et al. | |
| 2021/0199656 | A1 * | 7/2021 | Youngbull | G01N 1/2273 |
| 2022/0034854 | A1 * | 2/2022 | Chen | A61B 10/00 |
| 2022/0161272 | A1 * | 5/2022 | Byeon | B01D 47/027 |
| 2022/0280062 | A1 * | 9/2022 | DeMauro | A61B 5/082 |
| 2022/0313864 | A1 | 10/2022 | Kuru et al. | |
| 2022/0349804 | A1 | 11/2022 | Placella et al. | |

FOREIGN PATENT DOCUMENTS

| | | | |
|---|---|---|---|
| KR | 10-2294469 | B1 | 8/2021 |
| KR | 10-2022-0073622 | A | 6/2022 |
| WO | 2020/054940 | A1 | 3/2020 |

OTHER PUBLICATIONS

Kei Takenaka et al., “Airborne virus detection by a sensing system using a disposable integrated impaction device”, J. Breath Res. 2016 10 036009.
Inae Lee et al., “Integrated Bioaerosol Sampling/Monitoring Platform: Field Deployable and Rapid Detection of Airborne Viruses”, ACS Sens. 2020, 5, 3915-3922.
Laila Ladhani et al., “Sampling and detection of airborne influenza virus towards point-of-care applications”, PLOS ONE 2017 https://doi.org/10.1371/journal.pone.0174314 Mar. 28, 2017.
Hyeong Rae Kim et al., “An integrated system of air sampling and simultaneous enrichment for rapid biosensing of airborne coronavirus and influenza virus”, Biosensors and Bioelectronics 170 (2020) 112656.
Jyoti Bhardwaj et al., “Rapid Airborne Influenza Virus Quantification Using an Antibody-Based Electrochemical Paper Sensor and Electrostatic Particle Concentrator”, Environ. Sci. Technol. 2020, 54, 10700-10712.
Jeongan Choi et al., “Highly Enriched, Controllable, Continuous Aerosol Sampling Using Inertial Microfluidics and Its Application to Real-Time Detection of Airborne Bacteria”, ACS Sens. 2017, 2, 513-521.
Office Action of the KR application No. 10-2022-0184630 dated Dec. 9, 2025.

* cited by examiner

AEROSOL CAPTURE DEVICE AND CONTROL METHOD THEREOF

CROSS-REFERENCE TO RELATED APPLICATION

The present application claims priority and the benefit of Korean Patent Application No. 10-2022-0184630, filed on Dec. 26, 2022 in the Korean Intellectual Property Office, the entire disclosure of which is incorporated herein by reference.

BACKGROUND

1. Technical Field

The present invention relates to an aerosol capture device and a control method thereof, and more specifically, to an aerosol capture device and a control method for capturing and concentrating an aerosol in air through a capture liquid contained in an aerosol capture device.

2. Description of Related Art

In the atmosphere, there are various fine substances other than air, including particles such as fine dust, mold, bacteria, viruses, pollen, or the like. These particles can be defined as aerosols. Aerosols present in the atmosphere can occur in various indoor and outdoor environments.

To capture aerosols harmful to the human body, various methods are used. Among them, there is a device and method that captures an aerosol through a capture liquid. Therefore, capturing aerosols with the capture liquid offers the advantage of high capture efficiency. However, a disadvantage arises from the low aerosol concentration due to the large volume of the capture liquid. Consequently, there is a need for a device and method to concentrate the captured aerosol.

The background technology of the invention is disclosed in Korean Patent Publication No. 10-1754794 (registered on Jun. 30, 2017, title of invention: Bio aerosol capture device).

SUMMARY

The present invention is directed to providing an aerosol capture device that captures and concentrates an aerosol through a capture liquid.

The present invention is also directed to providing an aerosol capture device control method that captures and concentrates aerosol through a capture liquid.

According to an aspect of the present invention, there is provided an aerosol capture device including: a housing including an air inlet through which air is introduced, and an air discharge part through which the introduced air flows and the flowing air is discharged; a capture liquid that is accommodated in the housing and captures an aerosol in the air flowing inside the housing; and a concentration part that is disposed inside the housing, is in contact with the capture liquid, and concentrates the aerosol captured in the capture liquid.

The aerosol capture device may include a blower that moves external air into the housing and forces an air inside the housing to flow.

The housing may include a suction housing in which the air inlet is formed, and a circulation housing in which external air introduced through the air inlet flows, and the concentration part may be disposed on a movement path along which an air flowing from the suction housing to the circulation housing flows in one direction and is discharged to the air discharge part.

The housing may include a first housing and a second housing coupled to a lower portion of the first housing, the second housing may include a second suction housing through which the air is suctioned and a second circulation housing through which the air circulates, and a stepped portion may be disposed between the second suction housing and the second circulation housing to restrict a flow of the capture liquid from the second circulation housing to the second suction housing.

The aerosol capture device may include a guide part that is disposed inside the housing and guides the air to move to the capture liquid.

The guide part may be formed as a triangle, and the air may move toward the capture liquid along an inclined surface formed on the guide part.

The guide part may be formed in a streamlined shape, and the air may move toward the capture liquid along a curved surface formed on the guide part.

The housing may include a second circulation housing in which a flow path is formed, and the concentration part includes a concentration unit that is formed concavely downward in the flow path and fixes the aerosol.

A filter member that filters the aerosol may be disposed in the concentration unit.

An antibody that binds to the aerosol may be disposed in the concentration unit.

The capture liquid may include a magnetic bead to which the aerosol is attached, and a magnet that exerts an attractive force with the magnetic bead may be disposed on the lower portion of the concentration unit.

The aerosol capture device may include an electrode disposed in the concentration unit and configured to fix the aerosol and a power supply device that supplies power to the electrode.

The power supply device supplies AC power to the electrode, and the electrode may include an AC electrode to which the AC power is supplied and the aerosol is fixed.

The power supply device supplies DC power to the electrode, and the electrode may include a first DC electrode and a second DC electrode to which the DC power is supplied and the aerosol is fixed.

The electrode consists of a dielectric electrode, a dielectric member is disposed to be connected to the dielectric electrode, and the aerosol may be fixed to the dielectric member.

According to another aspect of the present invention, there is provided an aerosol capture device control method including: supplying a capture liquid into a housing; supplying air that contains an aerosol into the housing, coming the air into contact with the capture liquid, and capturing the aerosol with the capture liquid; concentrating the aerosol captured in the capture liquid in a concentration part using power of a power supply device; and discharging the capture liquid from the housing.

The method may further include discharging the capture liquid in which the aerosol is concentrated and accommodated in the concentration part to an outside of the housing.

According to another aspect of the present invention, there is provided an aerosol capture device control method including: supplying a capture liquid into a housing; supplying air that contains an aerosol into the housing, coming the air into contact with the capture liquid, and capturing the aerosol with the capture liquid; concentrating the aerosol captured in the capture liquid in a concentration part using a filter member, an antibody or a magnetic bead and a magnet; and discharging the capture liquid from the housing.

The method may further include separating the concentration part, which accommodates the capture liquid in which the aerosol is concentrated, from the housing.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
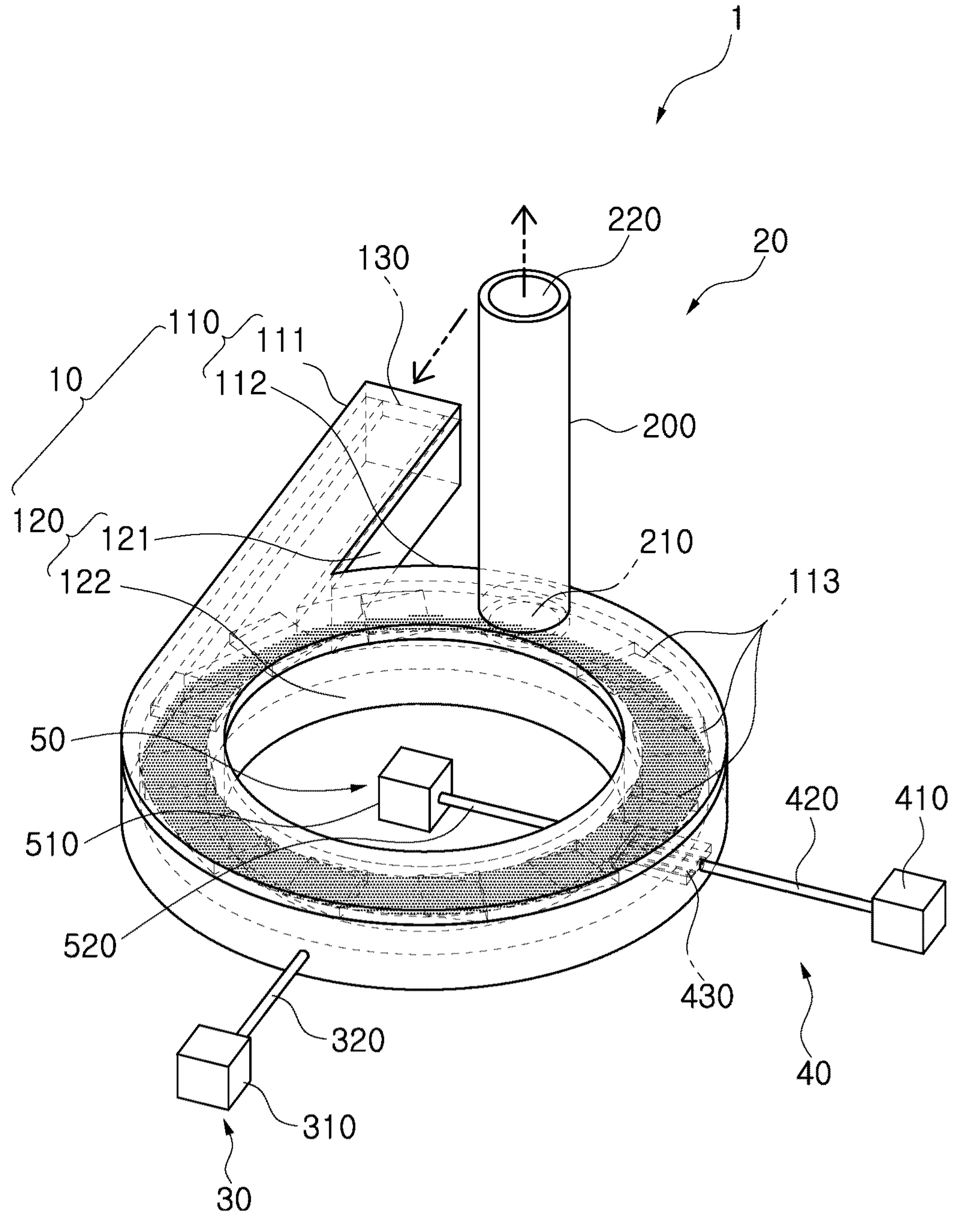
FIG. 1 is a perspective view of an aerosol capture device in one direction according to an embodiment of the present invention.

Hereinafter, with reference to the attached drawings, an aerosol capture device and a control method thereof according to the present invention will be described. In this process, the thickness of lines or sizes of components shown in the drawing may be exaggerated for clarity and convenience of explanation. In addition, terms described below are terms defined in consideration of functions in the present invention, and may vary depending on the intention or custom of the user or operator. Therefore, definitions of these terms should be made based on the content throughout this specification.

Figure 2:
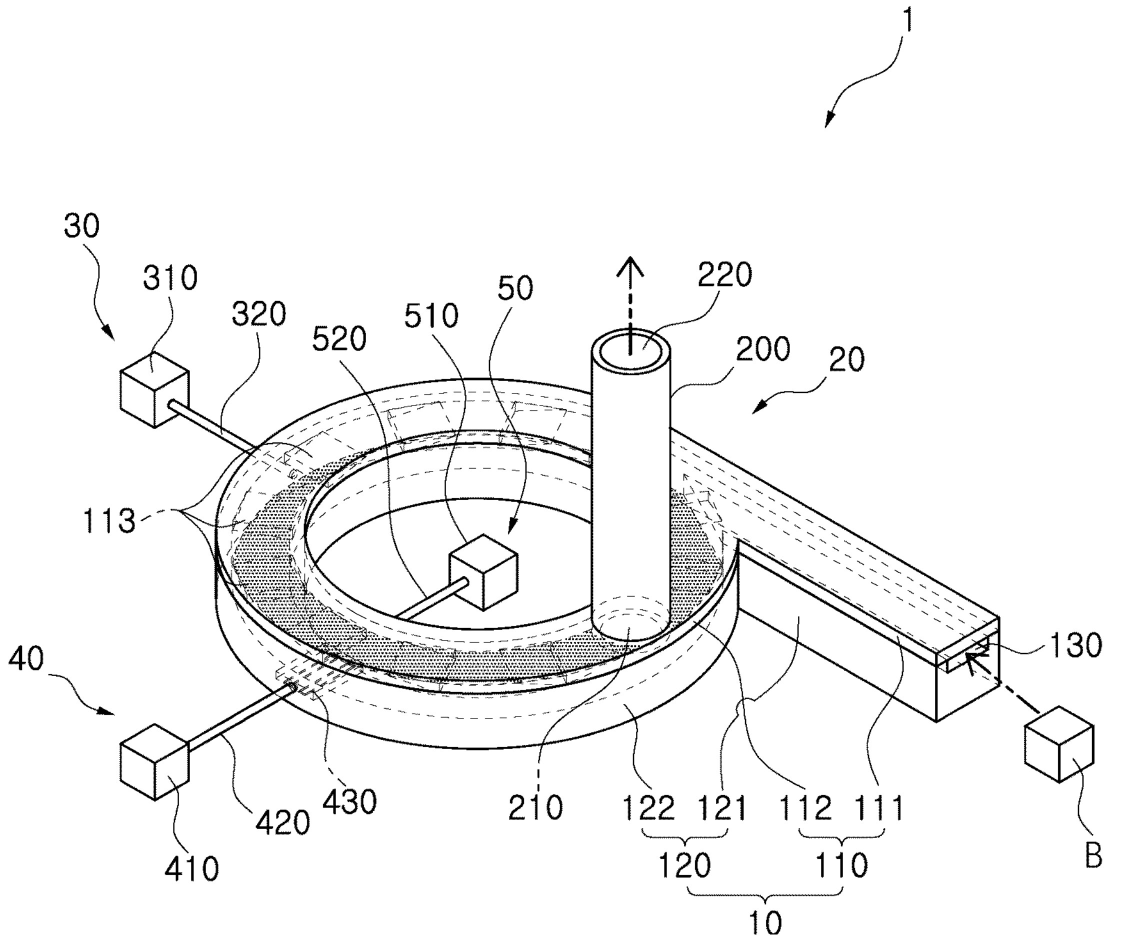
FIG. 2 is a perspective view of an aerosol capture device in another direction according to an embodiment of the present invention.
Figure 3:
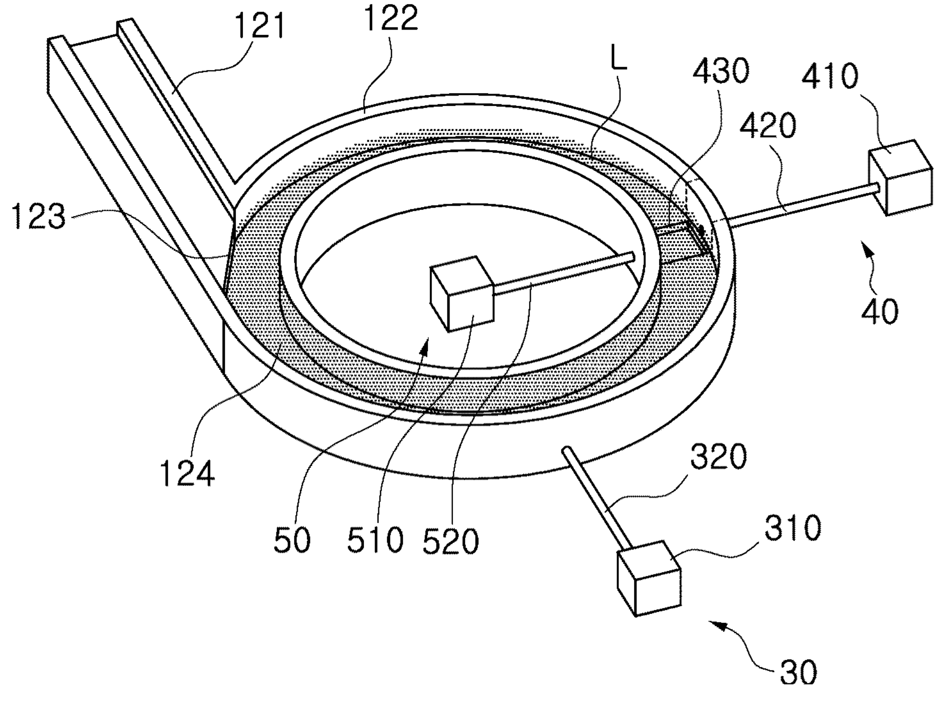
FIG. 3 is a perspective view of a second housing according to an embodiment of the present invention.

FIG. 1 is a perspective view of an aerosol capture device in one direction according to an embodiment of the present invention. FIG. 2 is a perspective view of an aerosol capture device in another direction according to an embodiment of the present invention. FIG. 3 is a perspective view of a second housing according to an embodiment of the present invention.

Referring to FIGS. 1, 2 and 3, an aerosol capture device 1 may include a housing 10, an air discharge part 20, a capture liquid inlet and outlet part 30, a concentration part 40, and a power supply unit 50.

The housing 10 may include an air inlet 130 through which air flows into the interior of the housing 10 and the air discharge part 20, which discharges air to the outside of the housing 10. The housing 10 may include a first housing 110 and a second housing 120. The first housing 110 and the second housing 120 may be vertically coupled, and air and a capture liquid L may be accommodated in a space formed between the first housing 110 and the second housing 120. The air inlet 130 through which air flows into the space formed between the first housing 110 and the second housing 120 may be disposed.

The housing 10 may include a suction housing 101 and a circulation housing 102. The suction housing 101 may include the air inlet 130, and the circulation housing 102 may include the air discharge part 20. The air introduced from the air inlet 130 of the suction housing 101 flows in the circulation housing 102 and may be discharged to the outside of the housing 10 through the air discharge part 20.

The suction housing 101 may include a first suction housing 111 and a second suction housing 121, and the circulation housing 102 may include a first circulation housing 112 and a second circulation housing 122.

The air inlet 130 may be a space formed by a gap between the first housing 110 and the second housing 120, and the air inlet 130 is connected to a blower B and may receive air from the blower. According to one embodiment, the air inlet 130 may be formed as a step formed in the second housing 120. According to another embodiment, the air inlet 130 may be formed as a step formed on the first housing 110.

The first housing 110 may include the first suction housing 111 and the first circulation housing 112, and the second housing 120 may include the second suction housing 121 and the second circulation housing 122. A shape of the first suction housing 111 and a shape of the second suction housing 121 may be formed to correspond to each other, and a shape of the first circulation housing 112 and a shape of the second circulation housing 122 may be formed to correspond to each other.

The air introduced through the air inlet 130 may flow into a space surrounded by the first suction housing 111 of the first housing 110 and the second suction housing 121 of the second housing 120. The first suction housing 111 and the second suction housing 121 may be formed in a straight line, and the shape of the first suction housing 111 and the second suction housing 121 is not limited to the straight line and may be formed as a curved line.

Air flowing along the first suction housing 111 and the second suction housing 121 may flow to the first circulation housing 112 and the second circulation housing 122. The first circulation housing 112 and the second circulation housing 122 may be formed in a substantially circular shape. Accordingly, the air flowing into the first circulation housing 112 and the second circulation housing 122 may circulate along the first circulation housing 112 and the second circulation housing 122. A hole may be formed in at least a portion of the first circulation housing 112, and the hole formed in the first circulation housing 112 may be connected to the air discharge part 20. The air discharge part 20 may be formed as part of the housing 10, or the air discharge part 20 may be formed as a separate member connected to the housing 10. Hereinafter, an invention in which the air discharge part 20 is formed as a separate member connected to the housing 10 will be described, but the embodiment in which the air discharge part 20 is formed as part of the housing 10 is not excluded.

A stepped portion 123 may be formed on at least a portion of the second circulation housing 122. The height of the bottom of the air inlet 130 formed inside the second suction housing 121 may be greater than the height of the bottom of a flow path 124 formed inside the second circulation housing 122, and the difference in bottom height may occur at the stepped portion 123. The capture liquid L and air in the flow path 124 may flow to circulate along the first circulation housing 112 and the second circulation housing 122. The movement of the capture liquid L accommodated in the flow path 124 to the second suction housing 121 may be restricted by the stepped portion 123. Accordingly, the capture liquid L may flow while circulating along the flow path 124 without escaping to the outside of the aerosol capture device 1. The capture liquid L may be water, or may be a liquid with high solubility for an aerosol S.

A first path 61 and a second path 62 may be distinguished based on the stepped portion 123, and the first path 61 and the second path 62 may be distinguished based on the air discharge part 20. A path along which air moves from the stepped portion 123 to the air discharge part 20 may be defined as the first path 61. Also, a path along which air moves from the air discharge part 20 to the stepped portion 123 may be defined as the second path 62. The air that is not discharged from the air discharge part 20 may move along the second path 62 and then along the first path 61.

The air discharge part 20 may discharge air circulating in the first circulation housing 112 and the second circulation housing 122 to the outside of the housing 10. The air discharge part 20 may be implemented as a hole formed in the housing 10. Alternatively, the air discharge part 20 may include a communication member 200, an air discharge inlet 210 and an air discharge outlet 220. The communication member 200 may be a hollow cylinder. One of two openings of the communication member 200 may be the air discharge inlet 210, and the other opening may be the air discharge outlet 220. The air discharge inlet 210 may be connected to a hole formed in the first circulation housing 112, and air moving to the communication member 200 through the air discharge inlet 210 may be discharged to the outside of the housing 10 through the air discharge outlet 220. The air discharge part 20 may be disposed adjacent to the stepped portion 123. The air supplied to the aerosol capture device 1 may circulate through the first circulation housing 112 and the second circulation housing 122 via the stepped portion 123 and then may be discharged to the outside of the housing 10 through the air discharge part 20. Accordingly, the air discharge part 20 may be disposed downstream of the stepped portion 123 in the first circulation housing 112. Upstream and downstream may be determined according to the direction of air flow, and the air flow direction shown in FIGS. 1 and 2 is counterclockwise, and accordingly, the air discharge part 20 may be disposed on the clockwise side of the stepped portion 123 in the first circulation housing 112. Alternatively, the air introduced into the housing 10 may be introduced into the circulation housing 102, move along the first path 61, and be discharged through the air discharge part 20. The air that is not discharged through the air discharge part 20 moves along the second path 62 and may then move along the first path 61. Accordingly, the air discharge part 20 may be disposed to increase a contact area between the air flowing in the circulation housing 102 and the capture liquid L.

One or more guide parts 113 may be disposed in the first circulation housing 112. The number of guide parts 113 disposed in the lower inside portion of the first circulation housing 112 may vary depending on the design. The guide part 113 is disposed in the lower portion of the first circulation housing 112, and circulating air may move to the flow path 124 of the second circulation housing 122 by the guide part 113. Accordingly, the number of collisions between the circulating air and the capture liquid P contained in the flow path 124 increases, and the contact area may increase. Embodiments of the guide part 113 will be described below along with the description of FIGS. 4 to 8.

The housing 10 may be connected to the capture liquid inlet and outlet part 30. The capture liquid inlet and outlet part 30 includes a motor or pump and may supply the capture liquid inside the housing 10 or discharge the capture liquid P contained inside the housing 10 to the outside of the housing 10. Accordingly, the level of the capture liquid P in the flow path 124 can be adjusted, and the appropriate volume ratio of air and the capture liquid P may be adjusted inside the housing 10. Accordingly, aerosol capture efficiency can be improved.

The capture liquid inlet and outlet part 30 may include a capture liquid inlet and outlet motor 310 and a capture liquid inlet and outlet pipe 320. By driving the capture liquid inlet and outlet motor 310, the capture liquid P may be supplied to the aerosol capture device 1 or discharged to the outside of the housing 10 through the capture liquid inlet and outlet pipe 320.

The housing 10 may be connected to the concentration part 40. The concentration part 40 may be disposed in the first path 61. The concentration part 40 may concentrate an aerosol S captured in the capture liquid P accommodated in the flow path 124. As the aerosol S is concentrated in the capture liquid P contained in the concentration part 40, the concentration of the aerosol S in part of the capture liquid P may be high. Accordingly, the aerosol S may be captured and concentrated through one aerosol capture device 1.

The concentration part 40 may include a concentration part motor 410, a concentration part inlet and outlet pipe 420 and a concentration unit 430. The concentration part motor 410 may discharge the capture liquid P and the aerosol S concentrated in the concentration unit 430 to the outside of the housing 10 through the concentration part inlet and outlet pipe 420. Alternatively, the concentration unit 430 may be a portion of the flow path 124, which is formed concave downward. The concentration unit 430 may be connected to or separated from the flow path 124, and the concentration unit 430 is separated from the flow path 124 so that a user can check, collect, and separate the capture liquid P in which the aerosol S is concentrated. Accordingly, the user can secure the capture liquid in which the aerosol S is concentrated through one device. The location of the concentration unit 430 is not limited, but is shown in FIG. 1 as being disposed at a side opposite to the stepped portion 123 for convenience of explanation.

The aerosol capture device 1 may include the power supply unit 50. The housing 10 may be connected to the power supply unit 50. The power supply unit 50 is connected to the concentration unit 430 of the concentration part 40 and may provide power required for concentration of the aerosol S. The power supply unit 50 may include a power supply device 510 and a wire 520. The power supply device 510 may supply DC or AC power to the concentration unit 430 through the wire 520. The concentration unit 430 may concentrate the aerosol S in the concentration unit 430 using the DC or AC power. Examples of the concentration unit 430 will be described below along with the description of FIGS. 10 to 15.

Figure 4:
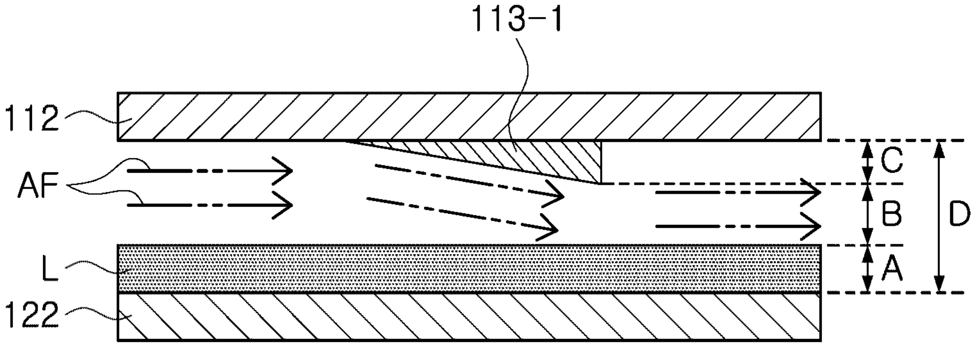
FIG. 4 is a cross-sectional view of a guide according to a first embodiment of the present invention.
Figure 5:
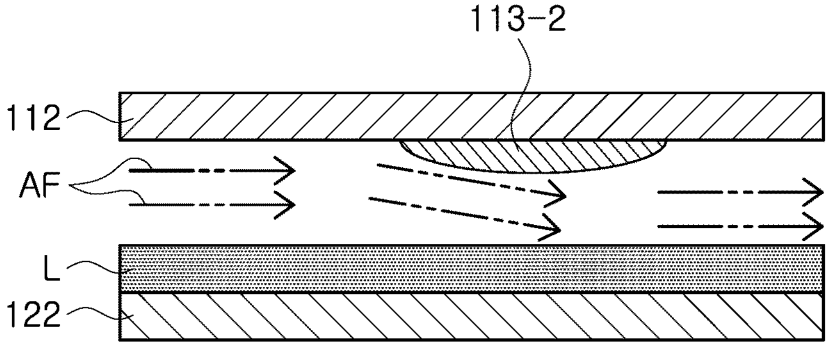
FIG. 5 is a cross-sectional view of a guide according to a second embodiment of the present invention.
Figure 6:
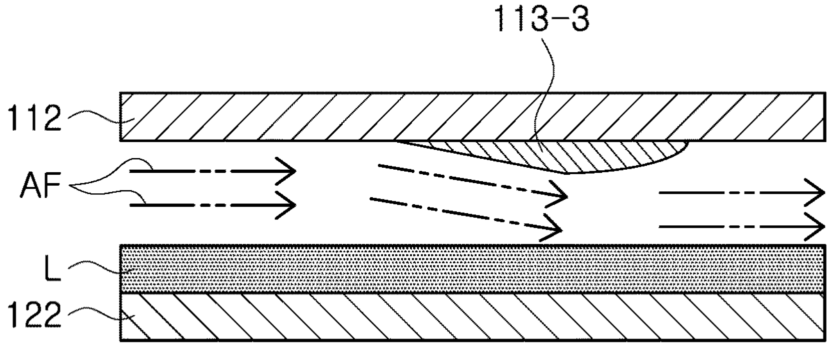
FIG. 6 is a cross-sectional view of a guide according to a third embodiment of the present invention.
Figure 7:
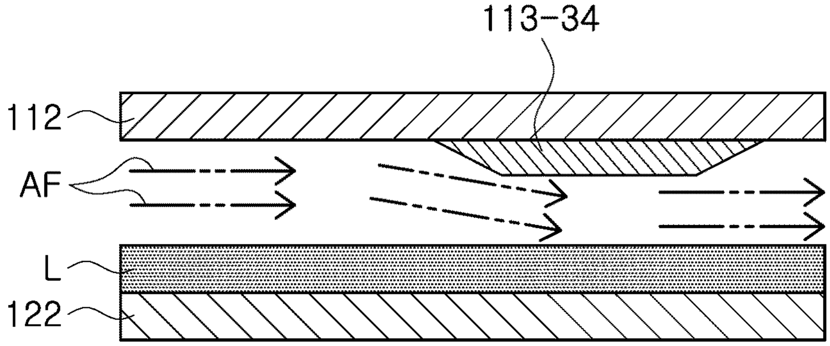
FIG. 7 is a cross-sectional view of a guide according to a fourth embodiment of the present invention.

FIG. 4 is a cross-sectional view of a guide according to a first embodiment of the present invention. FIG. 5 is a cross-sectional view of a guide according to a second embodiment of the present invention. FIG. 6 is a cross-sectional view of a guide according to a third embodiment of the present invention. FIG. 7 is a cross-sectional view of a guide according to a fourth embodiment of the present invention.

The first circulation housing 112, the guide part 113, the second circulation housing 122, and the capture liquid L shown in FIGS. 4 to 7 may be the same as or similar to the first circulation housing 112, the guide part 113, the second circulation housing 122, and the capture liquid L shown in FIGS. 1 to 3. Therefore, description of the same configuration may be omitted.

The capture liquid P and air may flow along the first circulation housing 112 and the second circulation housing 122. An air flow AF may be changed by the guide part 113 disposed in the first circulation housing 112. The air flow AF may be changed to be directed toward the capture liquid L by the guide part 113. The air may collide with the guide part 113 and move along the surface of the guide part 113 toward the second circulation housing 122. Alternatively, the air moves along the guide part 113, and vortices may be generated on the downstream side of the guide part 113, causing irregular movement in the air. Accordingly, the air may collide and/or come into contact with the capture liquid L accommodated in the flow path 124 of the second circulation housing 122.

The inner upper portion of the first circulation housing 112 and the inner lower portion of the second circulation housing 122 may be spaced a predetermined distance D from each other. The distance D between the upper inner portion of the first circulation housing 112 and the inner lower portion of the second circulation housing 122 may be equal to the sum of the height A of the capture liquid L accommodated in the flow path 124, the distance B between the capture liquid L and the guide part 113, and the height C of the guide part 113. As the space through which air can pass narrows as much as the height (C) of the guide part 113, the flow of air becomes faster, and thus the air quickly collides with the capture liquid L, allowing the aerosol S to be easily captured by the capture liquid L. The height A of the capture liquid L, the distance B between the capture liquid L and the guide part 113, the height C of the guide part 113, and the distance D between the first circulation housing 112 and the second circulation housing 122 may vary depending on a user's design.

Referring to FIG. 4, the shape of a first guide part 113-1 may be triangular. Air may move toward the capture liquid L along a slope of the first guide part 113-1 and come into contact and/or collide with the capture liquid L. Accordingly, the aerosol S contained in the air may move to the capture liquid L.

Referring to FIG. 5, the shape of a second guide part 113-2 may be a streamlined curve. Air may move along the surface of the second guide part 113-2, move toward the capture liquid L and come into contact and/or collide with the capture liquid L. Accordingly, the aerosol S contained in the air may move to the capture liquid L.

Referring to FIG. 6, the shape of a third guide part 113-3 may be a combination of an inclined surface and a streamlined curve. Air may move along the inclined surface and/or streamlined curve of the third guide part 113-2, move toward the capture liquid L, and come into contact and/or collide with the capture liquid L. Accordingly, the aerosol S contained in the air may move to the capture liquid L.

Referring to FIG. 7, the shape of a fourth guide part 113-4 may be trapezoidal. Air may move along the inclined surface and/or surface of the third guide part 113-2, move toward the capture liquid L, and come into contact and/or collide with the capture liquid L. Accordingly, the aerosol S contained in the air may move to the capture liquid L.

Therefore, as the air flow AF changes by the guide part 113 and the number of collisions and contact area between air and the capture liquid L increase, the aerosol S contained in the air may be captured in large quantities in the capture liquid L.

Figure 8:
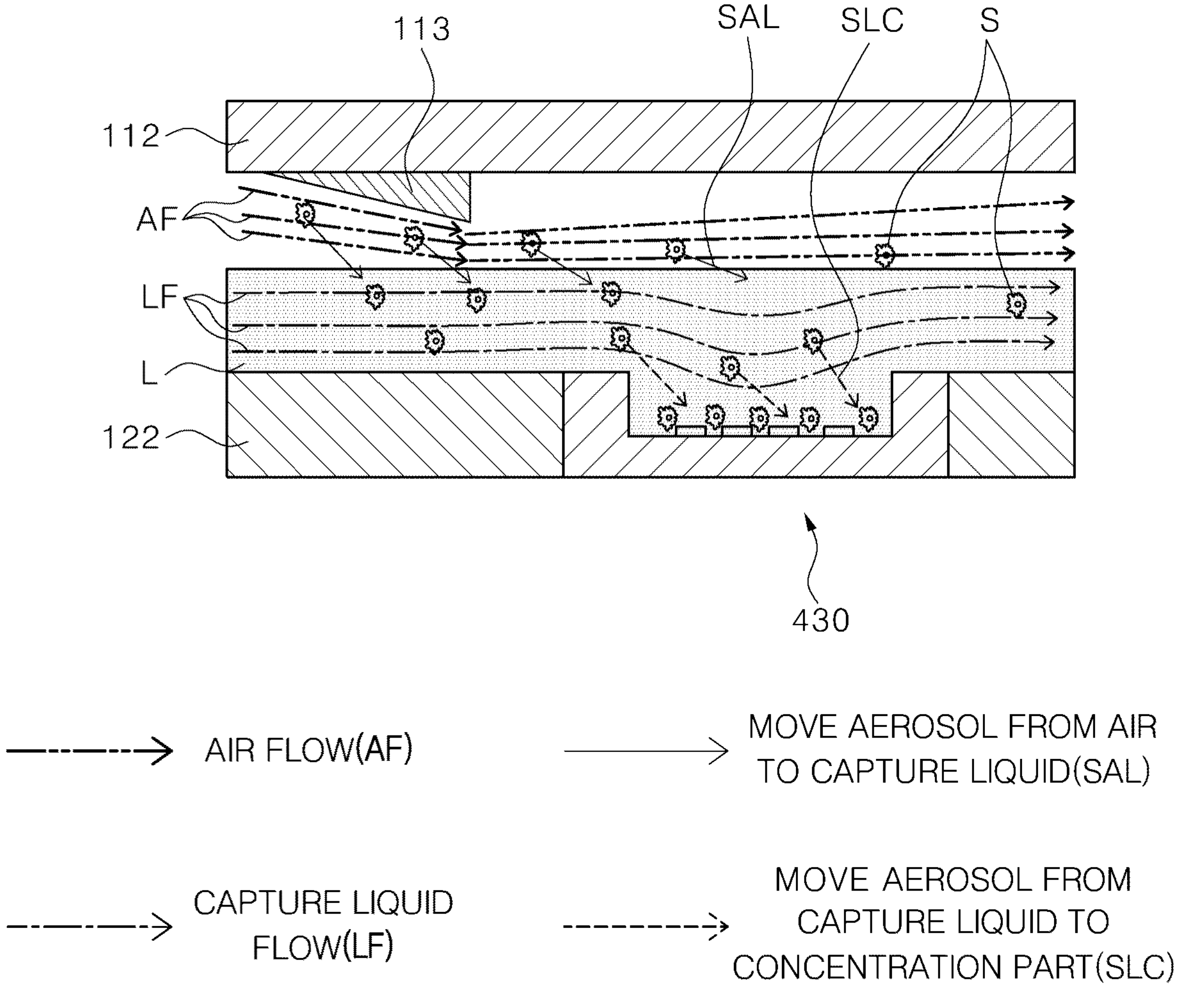
FIG. 8 is a cross-sectional view of a guide part and a concentration part according to an embodiment of the present invention.
Figure 9:
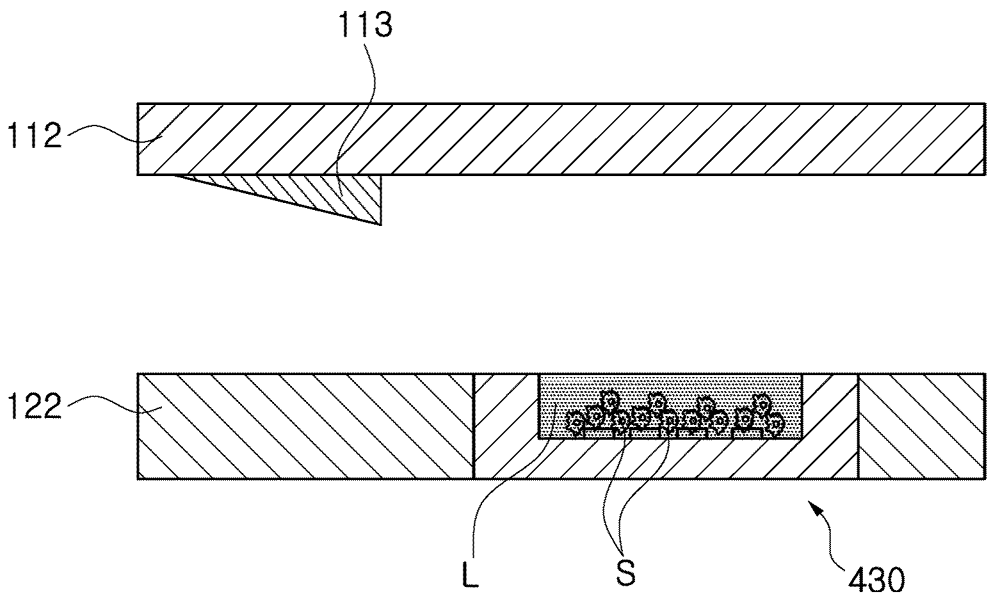
FIG. 9 is a cross-sectional view of the guide part, the concentration part, and a capture liquid from which some parts are removed, according to an embodiment of the present invention.

FIG. 8 is a cross-sectional view of the guide part and the concentration part according to an embodiment of the present invention. FIG. 9 is a cross-sectional view of the guide part, the concentration part, and a captured liquid from which some parts are removed, according to an embodiment of the present invention.

The first circulation housing 112, the guide part 113, the second circulation housing 122, the concentration unit 430, the capture liquid L, and the aerosol S shown in FIGS. 8 and 9 may be the same as or similar to the first circulation housing 112, the guide part 113, the second circulation housing 122, the concentration unit 430, the capture liquid L, and the aerosol S shown in FIGS. 1 to 7. Therefore, description of the same configuration may be omitted.

Referring to FIG. 8, the air flow AF may be changed by the guide part 113, the air moves downward along the slope of the guide part 113, and the aerosol S contained in the air may also move downward. Air moving downward may collide and/or come into contact with the capture liquid L, accordingly, movement SAL of the aerosol S from the air to the capture liquid L may occur, and the aerosol S may be captured by the capture liquid L.

The capture liquid L may move along the flow path 124, and the capture liquid L may come into contact with the concentration unit 430 that is formed to be concave downward in the flow path 124. As the concentration unit 430 is formed to be concave downward, the capture liquid flow LF may change. The capture liquid flow LF may flow adjacent to the concentration unit 430, and accordingly, the aerosol S captured by the capture liquid L may become closer to the concentration unit 430 or collide and/or come into contact with the concentration unit 430. The concentration unit 430 of the concentration part 40 can fix the aerosol S to the concentration unit 430 using various methods. Accordingly, aerosol movement SLC from the capture liquid L to the concentration part 40 may occur. The aerosol S, which is not captured in the concentration unit 430, may collide and/or come into contact with the concentration unit 430 while circulating along the capture liquid L and may be fixed to the concentration unit 430.

Referring to FIG. 9, the capture liquid L can be discharged to the outside of the housing 10 through the capture liquid inlet and outlet pipe 320 by driving the capture liquid inlet and outlet motor 310 of the capture liquid inlet and outlet part 30. As the capture liquid L is discharged to the outside of the housing 10, the level of the capture liquid L accommodated in the flow path 124 may decrease. Alternatively, the level of the capture liquid L may be lowered by evaporation of the capture liquid L. Accordingly, the capture liquid L may be accommodated in the concentration unit 430. Since the capture liquid L accommodated in the concentration unit 430 contains a large amount of aerosol S fixed to the concentration unit 430, the aerosol S can be concentrated. The method of fixing the aerosol S to the concentration unit 430 will be described below along with the description of FIGS. 10 to 15.

Figure 10:
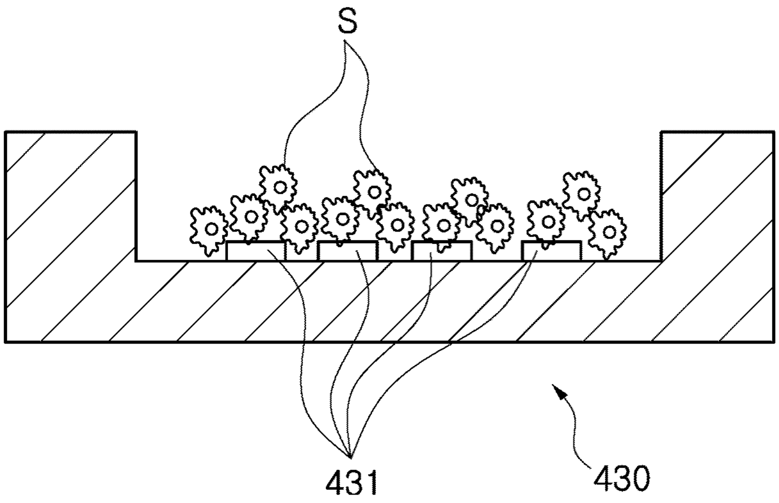
FIG. 10 is a cross-sectional view of a concentration part according to a first embodiment of the present invention.
Figure 11:
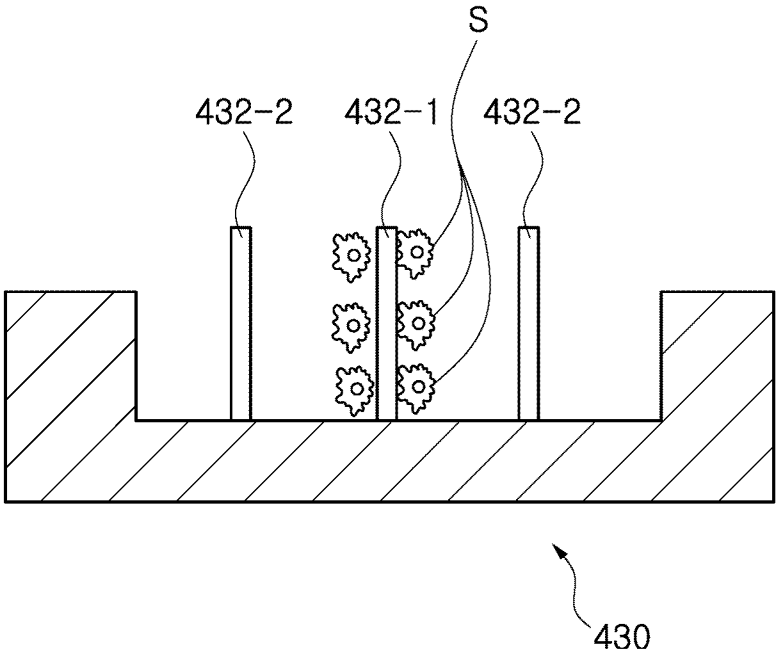
FIG. 11 is a cross-sectional view of a concentration part according to a second embodiment of the present invention.
Figure 12:
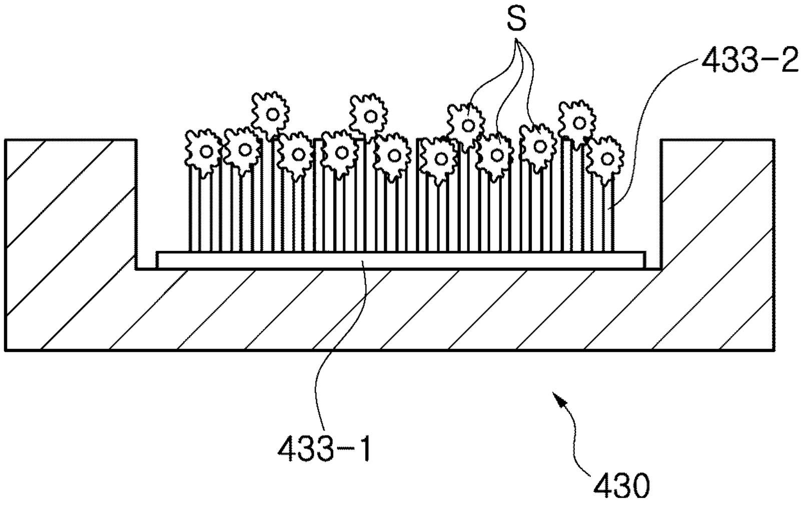
FIG. 12 is a cross-sectional view of a concentration part according to a third embodiment of the present invention.
Figure 13:
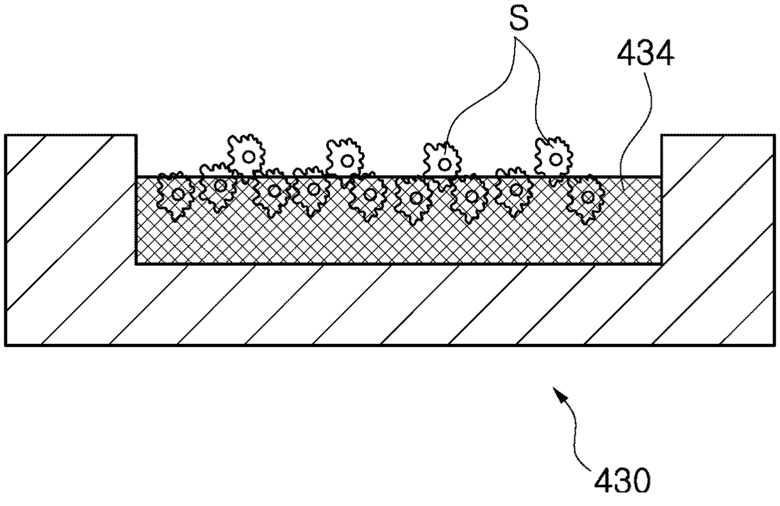
FIG. 13 is a cross-sectional view of a concentration part according to a fourth embodiment of the present invention.
Figure 14:
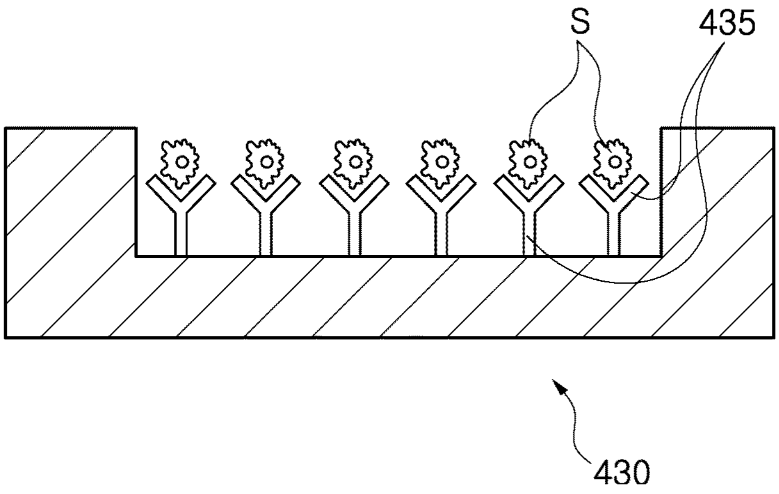
FIG. 14 is a cross-sectional view of a concentration part according to a fifth embodiment of the present invention.
Figure 15:
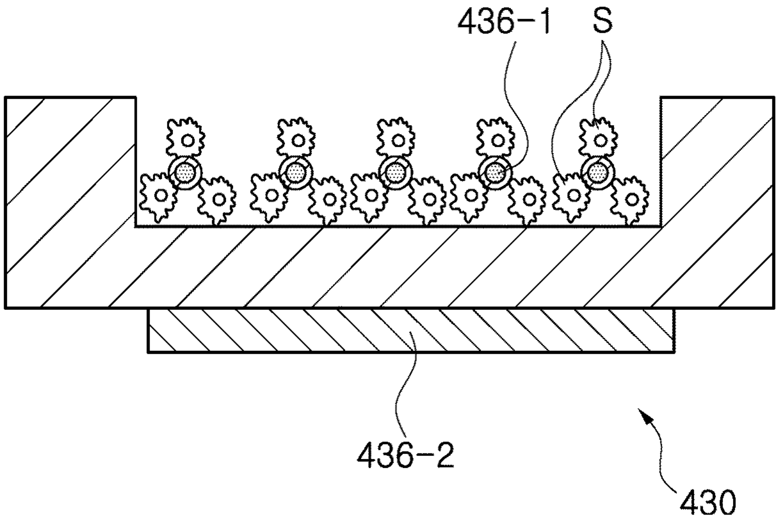
FIG. 15 is a cross-sectional view of a concentration part according to a sixth embodiment of the present invention.

FIG. 10 is a cross-sectional view of a concentration part according to a first embodiment of the present invention. FIG. 11 is a cross-sectional view of a concentration part according to a second embodiment of the present invention. FIG. 12 is a cross-sectional view of a concentration part according to a third embodiment of the present invention. FIG. 13 is a cross-sectional view of a concentration part according to a fourth embodiment of the present invention. FIG. 14 is a cross-sectional view of a concentration part according to a fifth embodiment of the present invention. FIG. 15 is a cross-sectional view of a concentration part according to a sixth embodiment of the present invention Referring to FIG. 10, an AC electrode 431 may be disposed in the concentration unit 430. The AC electrode 431 receives AC power from the power supply device 510 of the power supply unit 50 to allow an AC current to flow. The aerosol S may be fixed to the AC electrode 431 by the electrical force generated by AC power generated from the AC electrode 431. Accordingly, the aerosol S can be fixed to the concentration unit 430. In the concentration unit 430, the AC electrode 431 may be arranged horizontally or may be arranged vertically in the form of a pillar.

Referring to FIG. 11, a first DC electrode 432-1 and a second DC electrode 432-2 may be disposed in the concentration unit 430. The first DC electrode 432-1 and the second DC electrode 432-2 receive DC power from the power supply device 510 of the power supply unit 50 to allow a DC current to flow. The first DC electrode 432-1 may have a + pole, and the second DC electrode 432-2 may have a – pole. Alternatively, the first DC electrode 432-1 may have a – pole, and the second DC electrode 432-2 may have a + pole. The aerosol S may be fixed to the first DC electrode 432-1 and/or the second DC electrode 432-2 by the electric force generated from the first DC electrode 432-1 and/or the second DC electrode 432-2. Accordingly, the aerosol S may be fixed to the concentration unit 430. In the concentration unit 430, the first DC electrode 432-1 and/or the second DC electrode 432-2 may be arranged horizontally or may be arranged vertically in the form of a pillar.

Referring to FIG. 12, a dielectric electrode 433-1 and a dielectric member 433-2 may be disposed in the concentration unit 430. The dielectric electrode 433-1 may receive power from the power supply device 510 of the power supply unit 50 and allow a current to flow. The aerosol S may have polarizability, and by electrophoresis, the aerosol S may move to the dielectric electrode 433-1. The dielectric member 433-2 may be disposed to be connected to the dielectric electrode 433-1. The dielectric member 433-2 is connected to the dielectric electrode 433-1, so the effect of electrophoresis can be increased. In the concentration unit 430, the dielectric member 433-2 may be arranged horizontally or may be arranged vertically in the form of a pillar.

Referring to FIG. 13, a filter member 434 may be disposed in the concentration unit 430. The filter member 434 may have high adhesion to the aerosol S, or a plurality of small holes may be formed in the filter member 434 to filter the aerosol S, and thus the aerosol S may be fixed to the filter member 434. The material of the filter member 434 is not limited, and various types of the filter member 434 can be used depending on the type of aerosol S.

Referring to FIG. 14, an antibody 435 may be disposed in the concentration unit 430. The antibody 435 may bind to at least a portion of the aerosol S, thereby fixing the aerosol S to the concentration unit 430. According to one embodiment, when the aerosol S is a virus and the antibody 435 is disposed, the concentration unit 430 may effectively immobilize the aerosol S.

Referring to FIG. 15, a magnet 436-2 may be disposed adjacent to the concentration unit 430. According to one embodiment, the magnet 436-2 may be disposed below the concentration unit 430. The capture liquid L may include a magnetic bead 436-1, and the magnetic bead 436-1 may exert an attractive force with the magnet 436-2 and may have high adhesion to the aerosol S. The magnetic bead 436-1 circulates along the flow path 124 and comes into contact with the aerosol S, the aerosol S may circulate along the flow path 124 while in contact with the magnetic bead 436-1, and the magnetic bead 436-1 generates an attractive force with the magnet 436-2 disposed adjacent to the concentration unit 430, and may be fixed to the concentration unit 430.

Therefore, the capture liquid L containing the aerosol S fixed to the concentration unit 430 may be discharged to the outside of the housing 10 through the concentration part inlet and outlet pipe 420. By driving the concentration part motor 410, the capture liquid L containing the aerosol S may be discharged to the outside of the housing 10. Alternatively, the concentration unit 430 may be separated from the housing 10. In this way, as the concentration unit 430 is separated from the housing 10 or the capture liquid L containing the aerosol S fixed to the concentration unit 430 is discharged from the flow path 124, a user can confirm that the aerosol S is concentrated. In addition, the aerosol S is captured and concentrated through one device.

Figure 16:
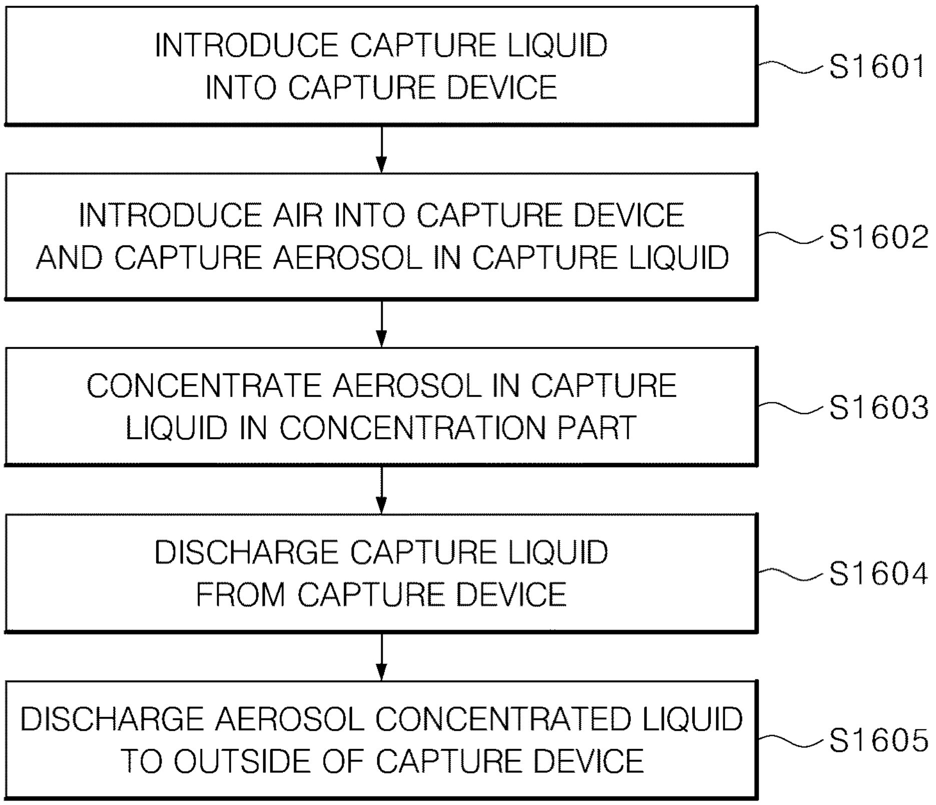
FIG. 16 is a flowchart of a method of controlling an aerosol capture device according to an embodiment of the present invention.

FIG. 16 is a flowchart of a method of controlling an aerosol capture device according to an embodiment of the present invention.

The capture liquid L may be introduced or supplied to an aerosol capture device 1 (operation S1601). The capture liquid L may be disposed lower than the stepped portion 123 of the aerosol capture device 1.

By introducing air into the aerosol capture device 1, the aerosol S may be captured in the capture liquid L (operation S1602). The introduced air moves along the first circulation housing 112 and the second circulation housing 122 of the aerosol capture device 1 and may come into contact and/or collide with the capture liquid L. Accordingly, the aerosol S contained in the air may be captured in the capture liquid L. The air introduced into aerosol capture device 1 collides with and/or comes into contact with the capture liquid L and may be discharged to the outside of the aerosol capture device 1 through the air discharge part 20.

The aerosol S captured by the capture liquid L may be concentrated in the concentration part 40 (operation S1603). The concentration unit 430, which is disposed in the concentration part 40, may fix the aerosol S to the concentration unit 430 by a method including a method using an electric force, a method using a magnetic force, filtering, and an antigen-antibody reaction. Accordingly, the capture liquid L containing the aerosol S may be concentrated in the concentration unit 430. The method of concentrating the capture liquid L containing the aerosol S in the concentration unit 430 is given in the description of FIGS. 10 to 14.

The operation of introducing air to aerosol capture device 1 to capture the aerosol S in the capture liquid L (operation S1602) and the operation of concentrating the aerosol S captured by the capture liquid L in the concentration part 40 (operation S1603) may proceed simultaneously.

A portion of the capture liquid L may be discharged to the outside of the aerosol capture device 1 and/or the housing 10 (operation S1604). As the capture liquid L is discharged to the outside of the aerosol capture device 1 and/or the housing 10, the capture liquid L contained in the concentration unit 430 and the fixed aerosol S may be disposed inside the aerosol capture device 1. The capture liquid L may be discharged to the outside of the housing 10 through the capture liquid inlet and outlet pipe 320. Alternatively, the concentration unit 430 may be formed to be separated from the housing 10. Accordingly, the user can capture and concentrate the aerosol S using one device.

According to the present invention, the aerosol capture device can reduce the waste of concentrated liquid by concentrating the capture liquid in which an aerosol is captured, and the capture liquid can be used for a long period of time.

The present invention has been described with reference to embodiments shown in the accompanying drawings, but these are merely illustrative, and those skilled in the art will recognize that various modifications and equivalent embodiments can be made therefrom. Additionally, the present invention can be used in other fields. Therefore, the true technical protection scope of the present invention should be defined in the claims below.

What is claimed is:

1. An aerosol capture device comprising:

a housing including an air inlet through which air is introduced, and an air discharge part through which the introduced air flows and the flowing air is discharged;

a capture liquid that is accommodated in the housing and captures an aerosol in the air flowing inside the housing; and a concentration part that is disposed inside the housing, is in contact with the capture liquid, and concentrates the aerosol captured in the capture liquid, wherein the housing includes a suction housing in which the air inlet is formed and a circulation housing in which a flow path through which the air and the capture liquid flow is formed, wherein the flow path is formed in a ring shape along the circulation housing, and wherein at least a part of the air and the capture liquid circulate along the flow path.

2. The aerosol capture device of claim 1, further comprising a blower that moves external air into the housing and forces an air inside the housing to flow.

3. The aerosol capture device of claim 1, wherein, the concentration part is disposed on a movement path along which an air flowing from the suction housing to the circulation housing flows in one direction and is discharged to the air discharge part.

4. The aerosol capture device of claim 1, wherein:

the housing includes a first housing and a second housing coupled to a lower portion of the first housing;

the second housing includes a second suction housing through which the air is suctioned and a second circulation housing through which the air circulates; and a stepped portion is disposed between the second suction housing and the second circulation housing to restrict a flow of the capture liquid from the second circulation housing to the second suction housing.

5. The aerosol capture device of claim 1, further comprising a guide part that is disposed inside the housing and guides the air to move to the capture liquid.

6. The aerosol capture device of claim 5, wherein the guide part is formed as a triangle, and the air moves toward the capture liquid along an inclined surface formed on the guide part.

7. The aerosol capture device of claim 5, wherein the guide part is formed in a streamlined shape, and the air moves toward the capture liquid along a curved surface formed on the guide part.

8. The aerosol capture device of claim 1, further comprising a capture liquid inlet and outlet part that is connected to the housing and supplies the capture liquid into the housing or discharges the capture liquid accommodated in the housing to an outside of the housing so that an amount of the capture liquid accommodated inside the housing is adjusted.

9. The aerosol capture device of claim 1, wherein, the concentration part includes a concentration unit that is formed concavely downward in the flow path and fixes the aerosol.

10. The aerosol capture device of claim 9, wherein a filter member that filters the aerosol is disposed in the concentration unit.

11. The aerosol capture device of claim 9, wherein an antibody that binds to the aerosol is disposed in the concentration unit.

12. The aerosol capture device of claim 9, wherein:

the capture liquid includes a magnetic bead to which the aerosol is attached; and a magnet that exerts an attractive force with the magnetic bead is disposed on the lower portion of the concentration unit.

13. The aerosol capture device of claim 9, further comprising:

an electrode disposed in the concentration unit and configured to fix the aerosol; and a power supply device that supplies power to the electrode.

14. The aerosol capture device of claim 13, wherein:

the power supply device supplies AC power to the electrode; and the electrode includes an AC electrode to which the AC power is supplied and the aerosol is fixed.

15. The aerosol capture device of claim 13, wherein:

the power supply device supplies DC power to the electrode; and the electrode includes a first DC electrode and a second DC electrode to which the DC power is supplied and the aerosol is fixed.

16. The aerosol capture device of claim 13, wherein:

the electrode includes a dielectric electrode;

a dielectric member is disposed to be connected to the dielectric electrode; and the aerosol is fixed to the dielectric member.

17. An aerosol capture device control method using the aerosol capture device of claim 1, comprising:

supplying a capture liquid into the housing;

supplying air that contains an aerosol into the housing, coming the air into contact with the capture liquid, and capturing the aerosol with the capture liquid;

concentrating the aerosol captured in the capture liquid in a concentration part using power of a power supply device; and discharging the capture liquid from the housing.

18. The method of claim 17, further comprising discharging the capture liquid in which the aerosol is concentrated and accommodated in the concentration part to an outside of the housing.

19. An aerosol capture device control method using the aerosol capture device of claim 1, comprising:

supplying a capture liquid into the housing;

supplying air that contains an aerosol into the housing, coming the air into contact with the capture liquid, and capturing the aerosol with the capture liquid;

concentrating the aerosol captured in the capture liquid in a concentration part using a filter member, an antibody or a magnetic bead, and a magnet; and discharging the capture liquid from the housing.

20. The method of claim 19, further comprising separating the concentration part, which accommodates the capture liquid in which the aerosol is concentrated, from the housing.

* * * * *